Inventor
Edward Hubbard Yonkers
by
Mason, Kolehmainen, Rathburn & Wyss
Attorneys

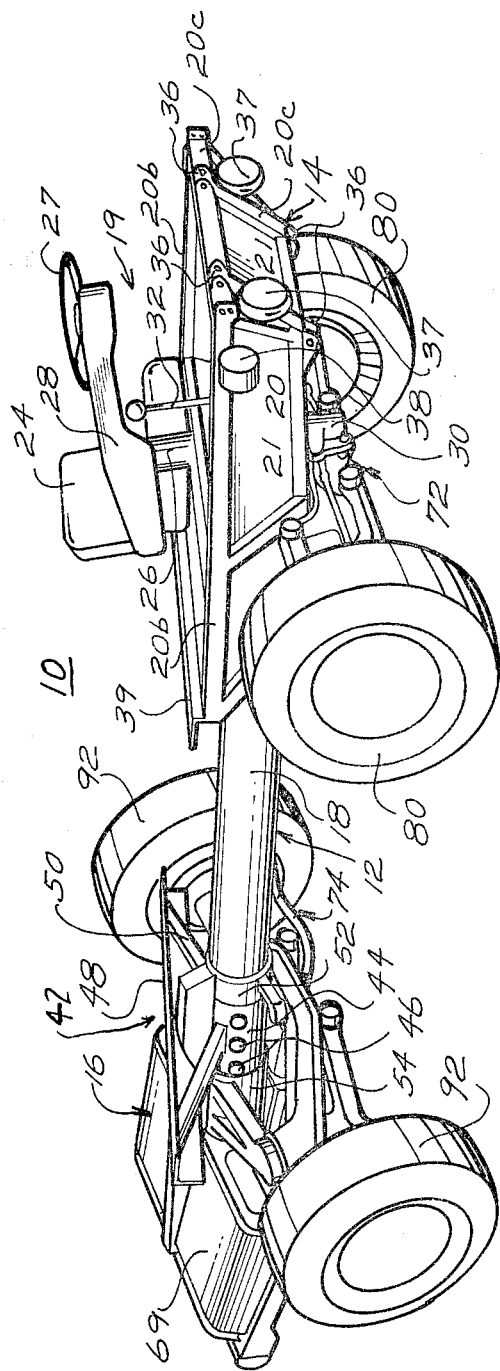

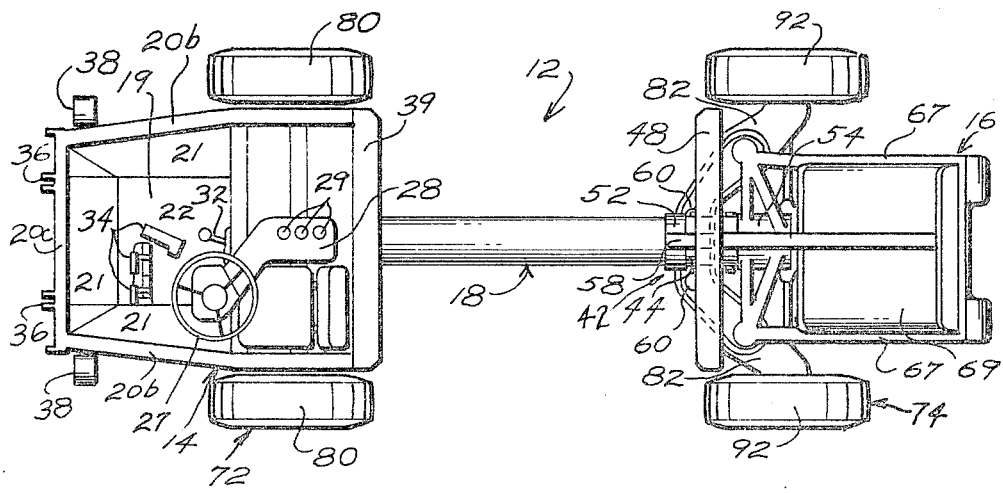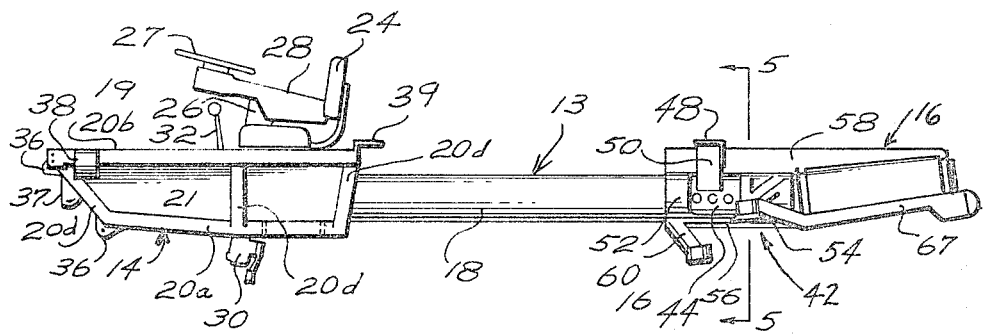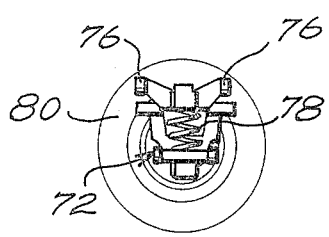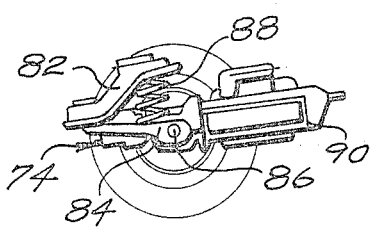

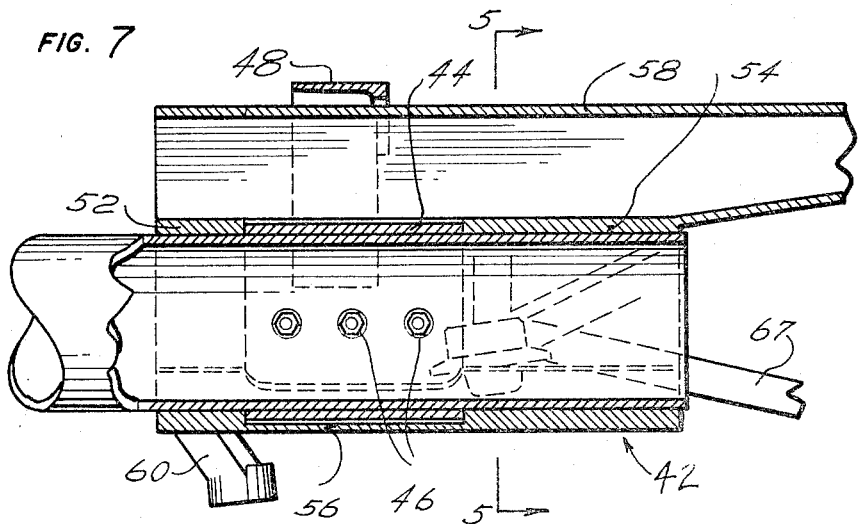
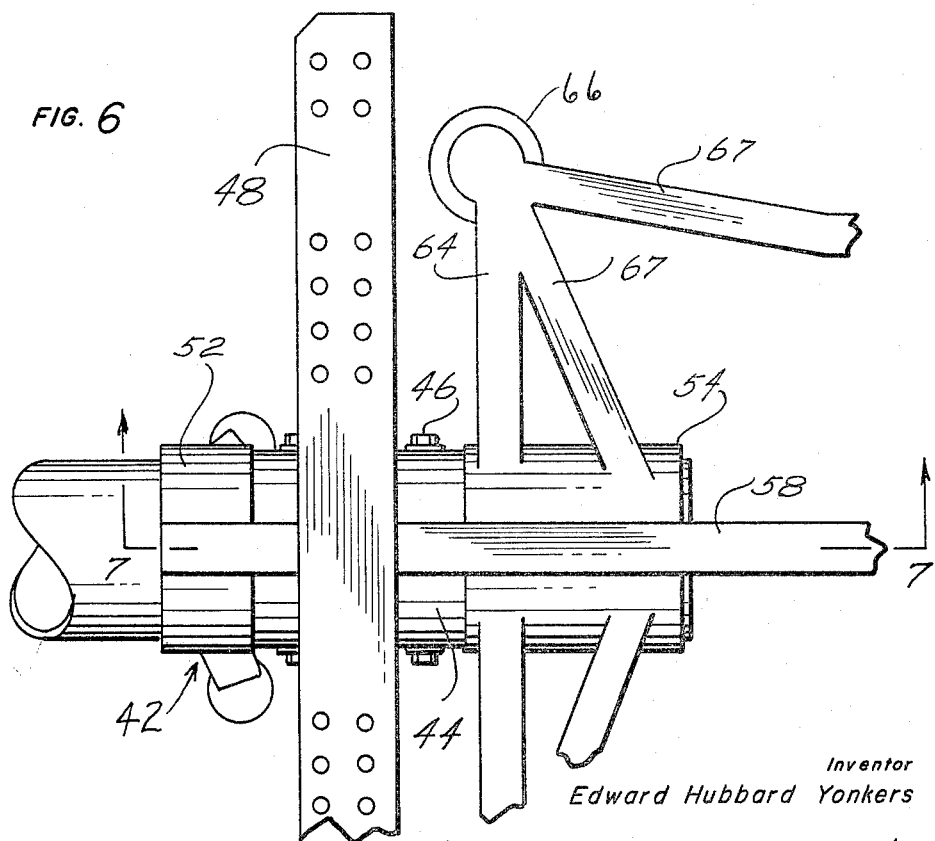

Oct. 4, 1966  E. H. YONKERS  3,276,532
VEHICLE

Filed Dec. 5, 1963  6 Sheets-Sheet 5

Inventor
Edward Hubbard Yonkers
by
Mason, Kolehmainen, Rathburn & Wyss
Attorneys Oct. 4, 1966  E. H. YONKERS  3,276,532
VEHICLE Filed Dec. 5, 1963  6 Sheets-Sheet 6

Inventor
Edward Hubbard Yonkers
by
Mason, Kolehmainen, Rathburn & Wyss
Attorneys

United States Patent Office 3,276,532
Patented Oct. 4, 1966

3,276,532
VEHICLE
Edward Hubbard Yonkers, New Delhi, India
Filed Dec. 5, 1963, Ser. No. 328,400
4 Claims. (Cl. 180—54)

The present invention relates to vehicles, and more particularly to motor-powered vehicles which are particularly adaptable for use in rough terrain and in remote areas where simplicity of construction and adaptability by the user are desirable requirements.

The commercially available type of motor vehicle widely in use today has an effectively unitary rigid frame with a body formed thereon by stamping and welding sheet metal. Such a rigid frame vehicle has inherent disadvantages for use on rough and uneven terrains. One difficulty which has been experienced on such a vehicle on an uneven surface is that the weight load on the different wheels of the vehicle will be different due to the fact that the rigid frame maintains the four wheels roughly in a plane rather than allowing them to conform to the uneven surface over which the vehicle is traveling. In fact, one or more wheels of a rigid frame vehicle can lose contact with the ground entirely on an uneven terrain, resulting in a total loss of traction or impairment of steering. The wheel suspension means customarily used on rigid frame vehicles compensates for this difficulty slightly by allowing each wheel to have independent vertical motion, however, this solution has been unsatisfactory in the more common two-wheel drive vehicles.

One solution which has been suggested for this problem is the provision of a four-wheel drive vehicle. While four-wheel drive vehicles are capable of traveling over rough terrain, they cannot be produced at low cost due to the complexity of the drive mechanisms involved. Therefore, it would be highly desirable to provide a two-wheel drive vehicle capable of traveling over rough terrain without the difficulties experienced by prior two-wheel drive vehicles.

In addition, a type of vehicle commonly in use today, due to its stamped and welded sheet metal body construction has a large ratio of surface area to mass, and thus has a large surface which is subject to corrosion. This difficulty is increased due to the fact that much of the surface area of the metal is not accessible and thus cannot be protected against corrosion. It is desirable to provide a vehicle having a small surface area-to-mass ratio in which all the surface area metal could be treated to prevent corrosion in order to overcome this difficulty.

Another disadvantage of the commonly available commercial vehicle in use today is that such vehicles are generally designed and used for a single limited purpose. A vehicle designed for use as a small truck or as a car, for example, cannot be easily adapted for other purposes. Also vehicles commonly in use today are characterized by the fact that the various components and structures making up the vehicle are interrelated to the extent that the vehicles are commonly made and assembled in one place. These characteristics make such vehicles highly unsuitable for use in the so-called underdeveloped countries where the technical skills and tools for their construction are not available. In addition, the expense of vehicles commonly in use today prohibits their importation into many such countries.

A further disadvantage of the commercially available motor vehicles is the fact that the rigid frame of the vehicle also serves as a frame for the load carrying portion of the vehicle. Thus, the frame for the load carrying portion of the vehicle is subjected to torsional stresses as the vehicle moves over an uneven terrain. As a result, the frame and the load carrying or body portion of the vehicle must be strong enough to resist these strains. The expenses involved in producing a body or load carrying portion of sufficient strength to withstand these torsional stresses inhibits the adaptability of the vehicle to different purposes. It would, therefore, be highly desirable to provide a vehicle characterized by the fact that the load carrying or body portion of the vehicle is free from such torsional stress. In such a vehicle, the body portion could be of light weight and, therefore, inexpensive. Since the investment in a body portion would be slight, several different body portions could be provided for interchangeable use to meet the changing demands on the vehicle.

It would be desirable, therefore, to provide a vehicle which would be adaptable for many different uses with a minimum of expense, and which is particularly adaptable for use in underdeveloped countries. It would also be desirable to provide a vehicle having a main frame and control portion of simple construction which could be fabricated with the skills and tools available in an underdeveloped nation and which could receive imported component parts easily attached in order to complete the vehicle. Quite importantly, the importation laws of many nations prevent the importation of a completed vehicle—but permit the importation of certain vehicle components so that it is foreseeable that the complex components of the vehicle such as the engine and wheel assemblies could be fabricated in the mass production factories of one country wherein high skill and technology is available, and that such components may be imported into an underdeveloped country for incorporation in a vehicle in such an underdeveloped country.

Accordingly, it is an object of this invention to provide an improved motor vehicle suitable to a marked degree for use in underdeveloped countries.

It is a further object of this invention to provide a motor vehicle capable of traveling over rough, underdeveloped terrain without the provision of the complex drive structure required for four-wheel drive vehicles.

It is still another object of the present invention to provide a motor vehicle capable of being easily adapted to any of several different uses.

It is another object of the present invention to provide an improved two-wheel drive motor vehicle characterized by the fact that the traction on the two-drive wheels will be equal and uninterrupted even on very rough terrain.

Still another object of the present invention is to provide an improved motor vehicle wherein the body or load carrying portion thereof is free from any torsional stresses exerted on the vehicle by a uneven terrain.

A further object of the present invention is to provide a motor vehicle having a small surface area to mass ratio wherein the surface areas of the vehicle are accessible and may be easily treated against corrosion.

Further objects and advantages of the present invention will become apparent as the following description proceeds and the features of novelty which characterize the invention will be pointed out with particularity in the claims annexed to and forming a part of this specification.

In accordance with these and other objects there is provided an improved two-wheel drive vehicle including an articulating frame and control structure of a simplified design capable of being fabricated or assembled without the use of complex tools and adapted to carry a selected one of a plurality of relatively simple bodies to adapt the vehicle to a desired use. Broadly, the improved vehicle chassis is formed of a longitudinal main frame with first wheel and frame structures rigidly secured to the longitudinal frame and second wheel and frame structures spaced from the first wheel and frame structures and articulately connected to the main frame to provide for relative pivotal rotation of the wheel and frame structures about the longitudinal axis of the vehicle chassis. Drive means are provided for driving one of the sets of wheels and, of course, vehicle control means are associated with one of the frame structures to provide the necessary control for the vehicle.

In one embodiment of the vehicle, the longitudinal main frame is formed of a solid or hollow tubular shaft member and the frame structures are quickly attachable thereto. Moreover, a front end suspension and control component and a rear end suspension and engine drive component are readily attachable to the respective frame structures so that the suspension and wheels, including the drive motor and controls, may conveniently be fabricated in one location and thereafter transported in sub-assembly form to the point of ultimate use where they may quickly be assembled with the frame structures to provide for the completed vehicle.

In a specific embodiment of this vehicle, the vehicle chassis includes a tubular main shaft forming the longitudinal frame of the vehicle. A front frame structure forming a cockpit means and carrying the necessary steering and other necessary control means for the vehicle is rigidly attached to the tubular frame member. Moreover, a rear frame structure for supporting the drive motor and necessary transmission structure is longitudinally spaced from the front wheel and frame structure and is articulately connected to the main frame member by a bearing interconnecting the rear structure and the main frame member for relative pivotal rotation about the longitudinal axis of the vehicle chassis. Effective three-point support is provided on the chassis for supporting a vehicle body or like load. In one particular embodiment of the vehicle, the front frame structure is provided with a transversely extending support rigidly fixed thereto, and a rigidly fixed rear support rigidly carried by the tubular frame member is provided for the body. Thus, the body of the vehicle rides in a plane determined by the angular position of the front frame structure, while the rear frame structure can articulate about a longitudinal axis relative to the body of the vehicle and the remainder of the vehicle chassis.

For a better understanding of the present invention, reference may be had to the accompanying drawing wherein:

FIG. 1 is a perspective view of the chassis of the basic motor vehicle in accordance with the present invention;

FIG. 2 is a plan view of the vehicle chassis of FIG. 1;

FIG. 3 is a partially exploded side view of the vehicle chassis of FIG. 1 illustrating sub-assemblies of the vehicle chassis;

FIG. 6 is a fragmentary plan view of the rear wheel and frame mounting structure of the vehicle in accordance with the present invention;

FIG. 7 is a cross-sectional side view of the rear wheel and frame structure of FIG. 6, taken along line 7—7 of FIG. 6;

Figure 8:
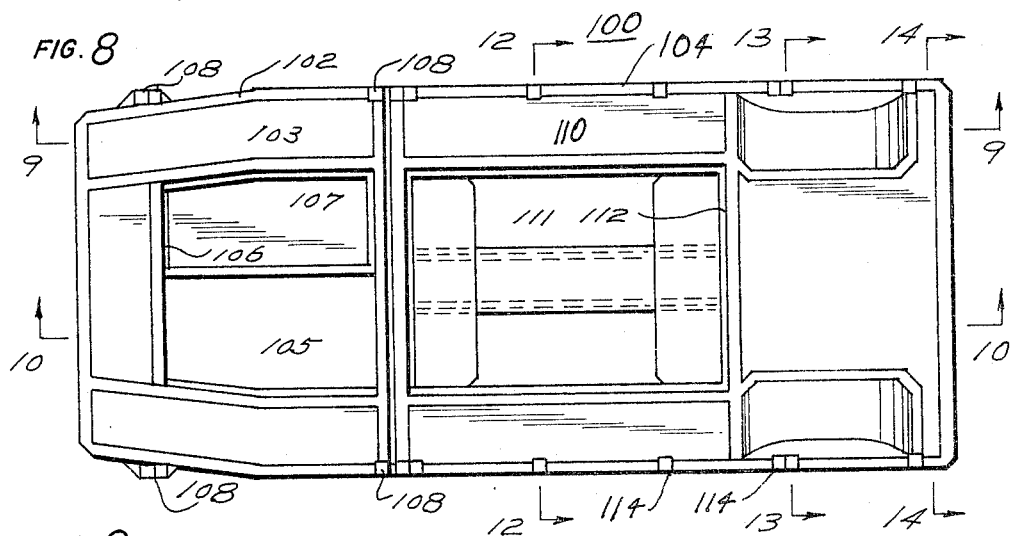
FIG. 8 is a plan view of a body for a vehicle formed in accordance with the present invention.
Figure 9:
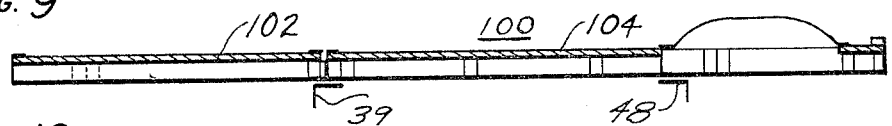
FIG. 9 is a cross-sectional view of the body structure of FIG. 8, taken along line 9—9 of FIG. 8.
Figure 10:
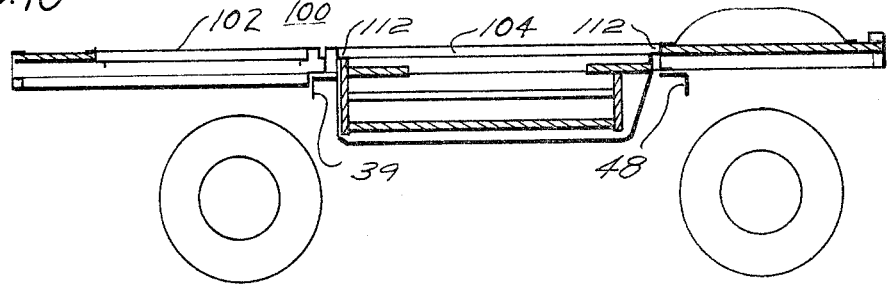
FIG. 10 is a cross-sectional view of the body structure of FIG. 8 taken along line 10—10 of FIG. 8
Figure 11:
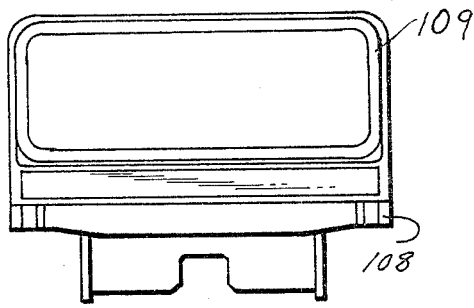
FIG. 11 is a front elevational view of a windshield assembly for the body structure of FIG. 8.
Figure 13:
Figure 14:
Figure 12:
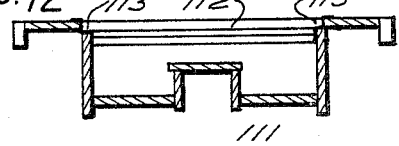

FIGS. 12, 13, and 14 are cross-sectional views of the body structure of FIG. 8, taken along lines 12—12, 13—13, and 14—14, respectively, of FIG. 8; and FIGS. 15 to 18 are side views of alternative body structures adapted for use with the vehicle constructed in accordance with the present invention.

Referring now to the drawings, and particularly to the embodiment of a vehicle illustrated in FIGS. 1 to 7, there is illustrated a motor-powered vehicle designated generally at 10 in accordance with the present invention. The vehicle 10, as illustrated, comprises essentially a vehicle chassis 12, which, in itself, is a complete vehicle which may be used with or without the addition of an additional vehicle body depending upon the use desired of the vehicle. The vehicle chassis 12 includes an articulating and control structure 13, comprising a forward frame or cockpit structure 14, a rear frame or motor supporting structure 16, and a longitudinal main frame member 18, along with additional components. The frame member 18, as illustrated, is a cylindrical tubular steel spine to which the cockpit structure 14 is non-rotatably fixed, and which is provided with articulating means connecting the motor structure 16 to provide for relative pivotal rotation of the rear or motor structure 16 relative to the forward or cockpit structure 14 about the longitudinal axis of the vehicle 10.

In order to form a cockpit 19 for the driver of the vehicle in the cockpit structure 14, there are provided a plurality of suitable cockpit frame elements 20. The frame elements 20 may be formed of any suitable material and joined in any configuration capable of forming a cockpit and providing suitable protection to the driver and the various controls associated with the vehicle. In the illustrated embodiment, frame members 20 are formed of square steel tubing, and consist of lower frame members 20a, FIGS. 2 and 3, upper frame members 20b, transverse frame members 20c, and vertical frame members 20d. In order to enclose the driver's cockpit area, and to provide a smooth external surface for traveling through underbrush and the like, a plurality of wall members 21 and a cockpit floor 22 are fastened to the various frame members 20. The material for the walls 21 and floor 22 may be sheet metal or other suitable material.

The equipment associated with the driver's cockpit 19 includes a driver's seat 24 which may be affixed to one or more of the frame members 20. It is understood that a passenger's seat could also be provided adjacent the driver's seat if desired.

According to one of the features of the invention, a steering shaft casing 26 encloses a generally vertical steering shaft which is linked to a steering wheel 27 by means of a suitable drive assembly contained in a control pedestal 28. The control pedestal 28 is also adapted to receive various indicator instruments 29, FIG. 2.

As best illustrated in FIG. 3, the steering shaft casing 26 terminates beneath the cockpit structure 14 in a steering connection 30 adapted to be connected with other components of the steering mechanism.

The provision of the upright steering asesmbly eliminates the common danger existing to the driver in present commercially available vehicles when the vehicle becomes involved in a front-end collision or the like. In such presently available vehicles, the steering shaft commonly extends in a forward direction from directly in front of the driver. Upon collision, the shaft occasionally becomes propelled in a rearward direction or directly at the driver. In addition, the provision of the upright shaft prevents damage to the steering assembly mechanism due ot minor impacts at the front end.

To enable the driver to control the motion of the vehicle 10, there are provided a gear shift lever 32, and a plurality of foot control pedals 34. These controls are suitably connected to the rear of the vehicle through the tubular frame member 18.

In order to provide for the attachment of various special equipment such as plows, winches, cranes, and the like, a plurality of attachment lugs 36 are provided at the front of the vehicle and affixed to the frame.

As is customary in motor vehicles, headlamps 37 and smaller lamps 38 may be provided at the forward and rear ends of the vehicle.

In order to provide support for a load carrying platform, or other type of body, a front deck supporting frame member 39 is fixed to the frame members 20 at the rear of the forward cockpit structure 14.

At the rearward end of the main frame member 18, there is provided an articulated joint 42 interconnecting the rear motor supporting structure 16 with the main frame member 18, and including a retaining rim 44 which is rigidly secured to the main frame member 18 by means of bolts 46.

A rear deck supporting frame member 48 is held above the retaining rim 44 by means of supporting brace members 50. Rear deck supporting frame 44 is thus non-rotatably held in relation to the frame member 18 and is arranged to be held in the same generally horizontal plane as the forward deck supporting frame 39.

The articulated joint 42 also includes rotatable rings 52 and 54 positioned on either side of the retaining ring 44. The rotatable rings 52 and 54 are free to rotate about the frame member 18, but are prevented from sliding on the frame member 18 by the retaining ring 44. Rings 52 and 54 are connected to rotate together by a connecting section 56 at the bottom of the main frame member 18 and by an upper longitudinal brace 58 at the top of the main frame member 18.

Affixed to the lower portion of the rotating ring 52 is a pair of generally outwardly extending frame members 60. These frame members 60 terminate in mounts 62 which serve for the attachment of another portion of the vehicle 10, as will be understood as this description proceeds. Similarly, from the rearward rotatable ring 54 there extends frame members 64 which terminate in another pair of mounts 66. Additional frame members 67 cooperate with the longitudinal brace 58 to form an engine covering and to form a framework for the rearward structure of the vehicle. An engine covering wall 69, FIGS. 1 and 2, associated with this framework may be fabricated of sheet metal or other suitable material.

As illustrated in FIG. 3, the forward and rear frame structures 14 and 16 and the main frame member 18, forming the articulating and control structure 13, comprise the basic structural components of the vehicle 10. The articulating and control structure 13 is adapted to receive a front end suspension and control component 72 and a rear end engine drive and suspension structure or component 74 in order to complete the vehicle. Most of the complex structure of the vehicle is contained in the components 72 and 74, while the articulating and control structure 13 can be fabricated by people having limited skill and machinery. The vehicle 10 has been designed to be capable of use in underdeveloped countries. Therefore, it is anticipated that the articulating and control structure 13 could be fabricated in such a country, while the components 72 and 74 could be imported into the country and attached to the articulating control structure 13 at the point of fabrication.

More specifically, the front end suspension component 72 includes mounting brackets 76, FIG. 3, adapted to be mounted to frame members 20 in the forward frame structure 14 by means of holes 73 provided therefor. The forward suspension assembly includes coil springs 78 as well as other suspension members, steering apparatus, and brake assembly, as is known to those skilled in the art, for providing the necessary support and control for front wheels 80. Thus, it can be seen that the front end suspension component 72 may be assembled as a unit, with or without wheels 80, which can later readily be mounted onto the vehicle 10.

The rear-end engine drive and suspension component 74 includes a frame mounting member 82, FIG. 3, adapted to be mounted on the mounts 62 and 66 which are associated with the rear frame structure 16. Pivotally connected to the frame mounting support 82 is a rear axle support 84 which is associated with a rear drive axle 86. Coil springs 88 are associated with the assembly as is known to those skilled in the art. In addition, there is provided a motor drive assembly 90 capable of supplying power to the rear axle 86 in the customary manner to drive rear wheels 92 to propel the vehicle 10. The rear engine drive suspension component 74 is designed to be fabricated and assembled as a unit for subsequent attachment to the vehicle 10.

Figure 4:
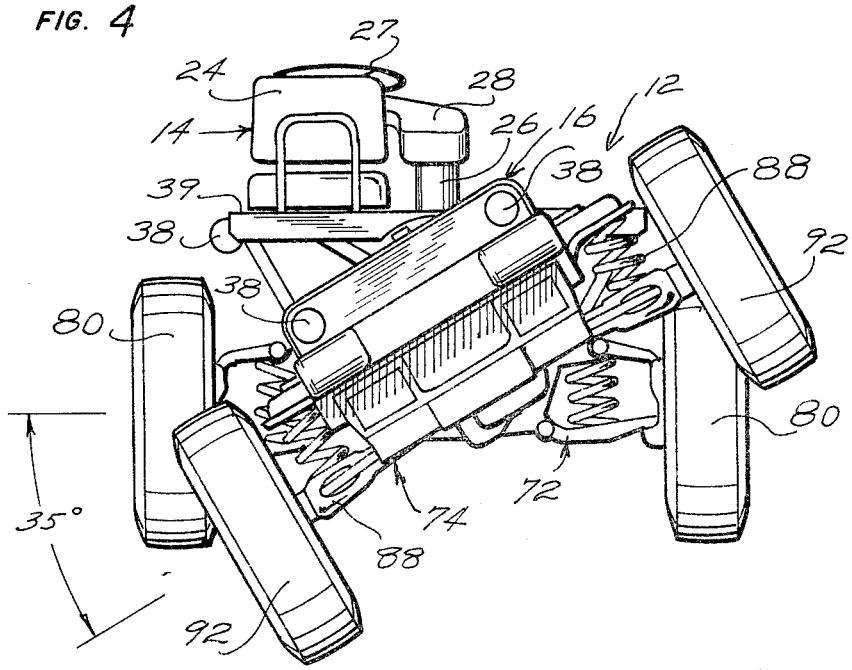
FIG. 4 is a rear view of the vehicle chassis of FIG. 1, taken with the rear wheel and frame structure rotated at an angle to the horizontal position thereby representing extremely uneven road conditions.
Figure 5:
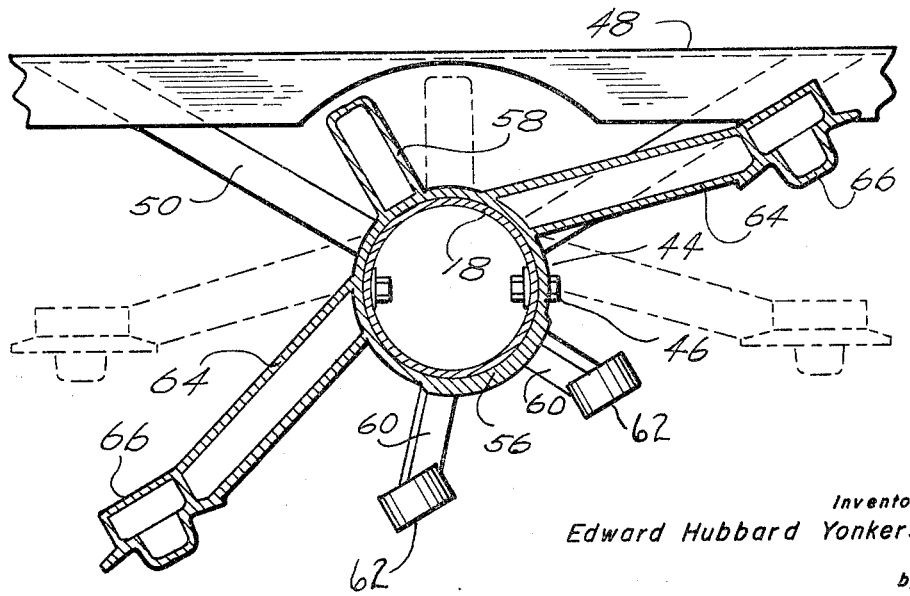
FIG. 5 is a cross-sectional view of the rear wheel and frame structure of the vehicle of FIG. 1, taken with the rear wheel and frame structure in the position of FIG. 4, and taken along line 5—5 of FIG. 3.

In operation, therefore, as best illustrated in FIGS. 4 and 5, it can be seen that the front wheels and the rear wheels are able to be rotatably displaced from one another due to the provision of the articulating joint associated with the main frame member 18. The entire front end assembly, the main frame member itself, and the rear deck supporting frame member 48 are rigidly held together and move with the main frame member 18. The rear end of the vehicle, including the rear frame and motor support structure 16, the rear engine drive and suspension component 74, and the rear wheels 92 are free to rotate about the frame member 18 because of the articulating joint 42.

In a vehicle constructed in accordance with the present invention, it was found that the rear axle was able to rotate through an arc of approximately 70 degrees with respect to the forward axle, as can be seen in FIGS. 4 and 5. This characteristic of the vehicle provides excellent performance over rough terrain, because the force on the two rear wheels will always be nearly equal so that each wheel may have excellent traction with the ground. Likewise, the two front wheels will also bear approximately equal upon the ground so that the steering of the vehicle will always be effective.

In addition, it should be noted that the vehicle constructed according to the present invention has a very small surface area to mass ratio when compared with rigid frame vehicles commonly in use. Thus, the vehicle is less subject to corrosion over a period of time, and, in addition, since the various surface areas of the present vehicle are easily accessible, it is a simple matter to treat these surfaces against corrosion. In fact, it is expected that the vehicle of the present invention will be able to outlast several of the rear-end engine drive and suspension components 74. In comparison, the rigid frame vehicle, commonly in use today, does not generally have a life exceeding that of the engine used therein.

It can be seen from the preceding description that rear deck supporting frame 48 and forward deck supporting frame 39 are both non-rotatably tied to the main frame member 18. Due to the ability of the rear wheel suspension system to rotate about this frame member, there will be no torsional stress on the main frame member 18, or on the supporting frame members 39 and 48. Therefore, the supporting frames 39 and 48 can be used to support a body or load carrying portion of the vehicle. This body or load carrying portion can be of very light weight construction due to the fact that it does not have to withstand any torsional stresses. One embodiment of such a body portion is shown in FIGS. 8 to 14, while other alternative embodiments are shown in FIGS. 15 to 18.

A main load or passenger carrying deck, designated generally at 100, is shown in FIGS. 8 to 14. The deck 100 is formed of two separate parts, a forward cockpit cover portion 102 and a rear platform portion 104. The forward portion 102 rests upon the cockpit frame members 20 and upon the forward part of the forward deck supporting frame 39. The rear platform 104 rests upon the rearward portion of the forward deck supporting frame 39 and upon the rear deck supporting frame 48. The forward portion 102 comprises a peripheral deck 103 and a central aperture 105 in which the driver and a passenger may be seated. The central aperture 105 may be bordered by a step channel 106 capable of receiving a deck panel 107 over the passenger area to provide additional deck space if desired. Mounting recesses 108 are provided along the perimeter of the forward portion 102 in order to receive windshield and roof bows which may be provided to form the framework of a cockpit enclosure. Such a windshield bow could enclose a windshield structure 109, FIG. 11, which would protect the driver and a passenger from inclement weather.

The rear platform 104 is designed for use exclusive of the front section and includes a peripheral deck portion 110 as well as a central recess 111 for seating of passengers or storage of various materials. Recess 111 may be bordered with step channels 112 in order to receive additional deck panels (not shown) to form a full deck. Additional mounting recesses 114 similar to mounting recesses 108 are spaced above the periphery of the rear platform 104. These mounting recesses are adapted to receive a plurality of U-shaped steel frames which may be mounted in the mounting recesses in a variety of positions. These frames may be used to support a weather cover, or other load, as may be desired.

Figure 15:
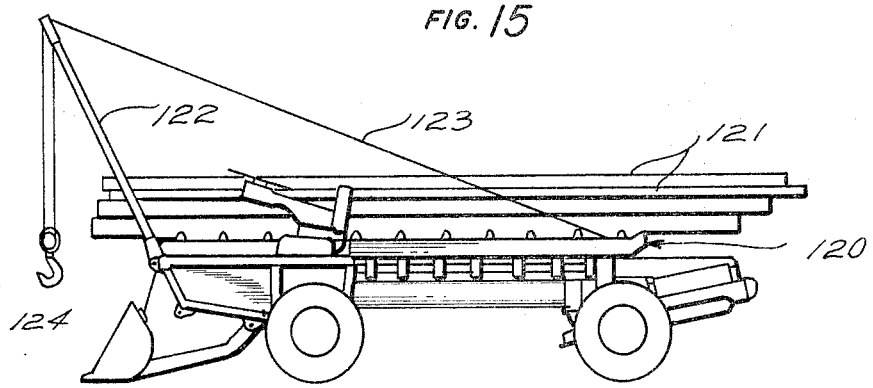

Referring now to the embodiment of a vehicle illustrated in FIG. 15, there is shown a vehicle of the type heretofore described provided with a flat-bed body 120 suitable for carrying long pieces of lumber 121 and the like. The body 120 will rest on the forward deck supporting frame 39 and the rear deck supporting frame 48 (not shown in FIG. 15) so as to be supported by the front frame structure 14 and the main frame member 18. Since the body 120 does not carry any torsional load of the vehicle it may be of comparatively light construction. Additionally, the vehicle illustrated in FIG. 15 is provided with a crane or hoist 122 having an operating cable 123 suitably connected to a power take-off or like device, and is additionally provided with a power operated drag shovel or scoop 124 to provide a desired work body for the vehicle.

Figure 16:
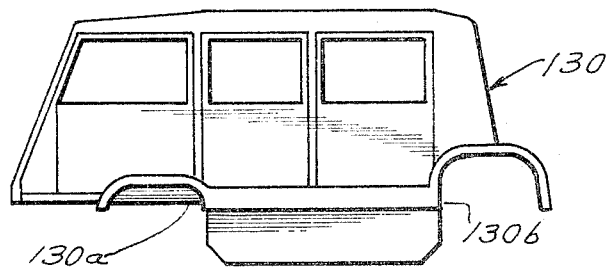

FIG. 16 illustrates a somewhat conventional type car body applicable to the vehicle according to the present invention. As therein shown, there is illustrated a vehicle body 130 having a forward section 130a suitably supported on the frame members 20 and on the forward deck supporting frame 39, and having a rear portion 130b supportable from the rear deck supporting frame 48 to provide the desired body for the vehicle.

Figure 17:
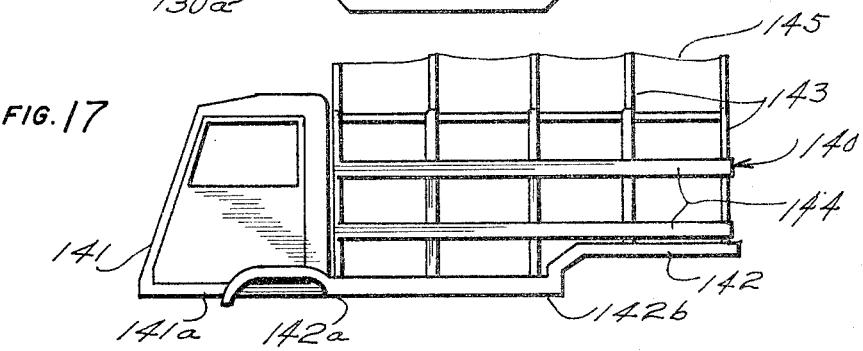

FIG. 17 illustrates a stake-body truck which, if desired, may be formed of hoops and covered with canvas or like tarpaulin to provide an enclosure. More specifically, FIG. 17 illustrates a body 140 including a cab portion 141 for an operator which is suitably supported at its lower surface 141a on the frame members 20 and on the forward deck supporting frame 39. Additionally, the stake-body 140 includes a truck body 142 having a forward portion 142a supported on the rear portion of the forward deck supporting frame 39 and having a rear portion 142b supported on the rear deck supporting frame 48. Extending from the bed 142 of the body 140 is a plurality of vertical stakes or hoops 143 and a plurality of longitudinal side boards 144 to provide a stake bed for the vehicle. However, if desired, the vertical stakes 143 may be in the form of hoops and the entire body 142 covered with a suitable tarpaulin 145 to provide an enclosure for the vehicle.

Figure 18:
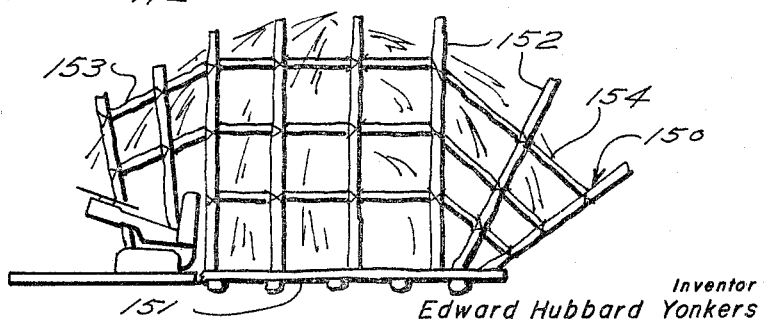

FIG. 18 illustrates an open-stake body suitable for carrying hay and the like and, as illustrated, there is shown a body 150 including a bed portion 151 suitably mounted between the forward deck supporting frame 39 and the rear deck supporting frame 48. Extending upwardly from the bed portion 151 is a plurality of stakes 152 and a plurality of generally horizontal side boards 153 to provide a retaining enclosure for hay 154 or the like in the body 150.

It will be seen that a motor vehicle according to the present invention may be readily adapted to a plurality of inexpensive bodies so as to adapt the vehicle to a particularly desirable use. Advantageously, the motor vehicle provided with the articulating frame is particularly useful over rough or uneven terrain such as could be experienced in underdeveloped countries. Moreover, inasmuch as the front end suspension component 72 and the rear end engine drive suspension component 74 may be manufactured remote from the remainder of the vehicle and readily crated and shipped to the point of final assembly within a vehicle, the vehicle according to the present invention is readily adaptable for final assembly in underdeveloped countries which do not have a high standard of technology or a high tooling ability. Consequently, the present vehicle, which approaches the drive characteristics of a four-wheel drive, is simple to assemble, economical to manufacture, and affords a high degree of adaptability to various conditions and terrain.

Although the present invention has been described by reference to only a single embodiment thereof, it will be apparent that numerous other modifications and embodiments may be devised by those skilled in the art, and it is intended by the appended claims to cover all modification and embodiments which will fall within the true spirit and scope of the present invention.

What is claimed as new and desired to be secured by Letters Patent of the United States is:

1. A vehicle chassis comprising longitudinal main frame means; a first frame structure including a first wheel suspension component rigidly secured to said frame means; a second frame structure including a second wheel suspension component spaced from said first structure and articulately connected to said main frame means to provide for relative pivotal rotation of said structures about the longitudinal axis of said vehicle chassis; drive means operatively associated with at least one of said structures; vehicle control means operatively associated with at least one of said structures and including vehicle body supporting frame means carried by said first structure; and additional body supporting means carried by said main frame means spaced from said body supporting frame means and adapting said vehicle chassis effectively to support a vehicle body at three points without transmitting any torsional loads from the main frame to the body.

2. A vehicle, comprising in combination, a vehicle chassis as set forth in claim 1, and a vehicle body carried by said body supporting frame means and said body supporting means.

3. A vehicle chassis comprising a front frame structure; a rear frame structure; control means operatively associated with at least one of said structures; drive means operatively associated with at least one of said structures; front wheel suspension means carried by front frame structure; rear wheel suspension means carried by said rear frame structure; and longitudinal frame means including a tubular end portion interconnecting said structures one of said frame structures including spaced rings rotatably positioned on said portion and a retaining ring secured to said portion intermediate said spaced rings to permit rotation of said one of said frame structures about said portion while preventing sliding of said one of said frame structures on said portion thereby providing an articulated connection between said frame structures to provide for relative pivotal rotation of said structures about the longitudinal axis of said vehicle chassis.

4. A vehicle chassis as set forth in claim 3 above including body supporting means defined on the other of said frame structures and additional body supporting means extending integrally from said retaining ring.

References Cited by the Examiner

UNITED STATES PATENTS

| 1,991,619 | 2/1935 | Mackenzie | 180—54 XR |
| 2,121,687 | 6/1938 | Daus | 180—54 |

(Other references on following page)

UNITED STATES PATENTS

| | | | |
|---|---|---|---|
| 2,305,305 | 12/1942 | Porsche | 180—54 |
| 2,421,351 | 5/1947 | Page | 180—54 XR |
| 2,425,948 | 8/1947 | Lucien | 180—11 |
| 2,540,859 | 2/1951 | Birkin | 180—11 |

FOREIGN PATENTS

| | | |
|---|---|---|
| 394,554 | 6/1933 | Great Britain. |
| 282,585 | 8/1952 | Switzerland. |

BENJAMIN HERSH, *Primary Examiner.*

MILTON L. SMITH, *Examiner.*